(12) United States Patent
Apparao et al.

(10) Patent No.: US 7,392,257 B2
(45) Date of Patent: Jun. 24, 2008

(54) INCORPORATING STRUCTURAL INFORMATION INTO AN EXTENSIBLE MARKUP LANGUAGE DOCUMENT

(75) Inventors: Padmashree K. Apparao, Portland, OR (US); Krishna Kant, Portland, OR (US); Ravishankar R. Iyer, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 511 days.

(21) Appl. No.: 10/999,502

(22) Filed: Nov. 30, 2004

(65) Prior Publication Data

US 2006/0117033 A1    Jun. 1, 2006

(51) Int. Cl.
    *G06F 7/00* (2006.01)
(52) U.S. Cl. .................... 707/100; 707/101; 707/102
(58) Field of Classification Search .......... 707/100–102
    See application file for complete search history.

(56) References Cited

U.S. PATENT DOCUMENTS

| | | | |
|---|---|---|---|
| 6,606,620 B1* | 8/2003 | Sundaresan et al. | 707/3 |
| 2001/0027420 A1* | 10/2001 | Boublik et al. | 705/26 |
| 2002/0013791 A1* | 1/2002 | Niazi et al. | 707/516 |
| 2002/0143521 A1* | 10/2002 | Call | 704/1 |
| 2003/0066033 A1* | 4/2003 | Direen et al. | 715/513 |

\* cited by examiner

*Primary Examiner*—Wilson Lee
*Assistant Examiner*—Michael Le
(74) *Attorney, Agent, or Firm*—Trop, Pruner & Hu, P.C.

(57) ABSTRACT

In one embodiment, the present invention includes a method of analyzing an extensible markup language (XML) file, generating structural information for the XML file, and incorporating the structural information into the XML file. The structural information may correspond to a hierarchy of the file and may further include size information corresponding to elements of the file. In such manner, the structural information may be transmitted with the XML file and used to aid a receiver of the file in parsing. Other embodiments are described and claimed.

21 Claims, 5 Drawing Sheets

INCORPORATING STRUCTURAL INFORMATION INTO AN EXTENSIBLE MARKUP LANGUAGE DOCUMENT

BACKGROUND

The present invention relates to communication of data between devices, and more particularly to communication of such data via a network.

Extensible Markup Language (XML) has become the de facto standard for flexible information exchange (storage and communication) over the Internet. For instance, XML is commonly used as a message format in distributed systems. Typically, in order to process an XML message, it is converted to an intermediate representation such as a document object model (DOM) tree. For further manipulation of this data, this tree is modified using standard tree traversal algorithms. Once the modifications are complete, the tree is converted (streamed) back into XML and propagated to another system over a network as an XML message. Such communications, which are prevalent in electronic commerce (e-commerce) applications, provide the ability for various entities to manipulate data within an XML document and provide the manipulated document back to its source.

For example, a consumer may access an on-line catalog to select one or more items for purchase. To complete an order, the consumer provides his or her address information, credit card information and the like, by inserting data into a browser screen. This data may accordingly modify the underlying XML document. This modified version of the document, which contains the customer's information, is then provided to the e-commerce retailer (e-tailer).

The e-tailer may then parse the modified document to obtain and utilize the data, including the address information, credit card information, ordering information, and the like. However, the parsing process can be quite computationally intensive. Accordingly, a need exists to improve handling of XML documents.

DETAILED DESCRIPTION

In various embodiments in order to speed up handling of XML documents, structural information may be incorporated into an XML message. More specifically, structural information corresponding to a hierarchical representation, such as a tree structure of an XML document, may be generated. In one embodiment, a hierarchical representation of the XML message may be captured using a vector format, such as a bit vector format. Furthermore, additional structural information, such as an indication of the size for each of the elements within an XML document may be generated. For example, in addition to the vector, an array containing size information of the individual elements of the XML message may also be generated. The structural information vector can be sent along with the XML message to convey the document structure to a receiver.

In turn, the structural information incorporated in or otherwise associated with the XML document may be used by the receiver to aid in efficient handling of the document. That is, the receiver may use the structural information to create a tree structure of the message and allocate memory for it, even before parsing the message to extract the elements. In some embodiments, once memory allocation is complete, the parsing of the document to fill the tree structure may be off-loaded to a hardware assist device.

Figure 1:
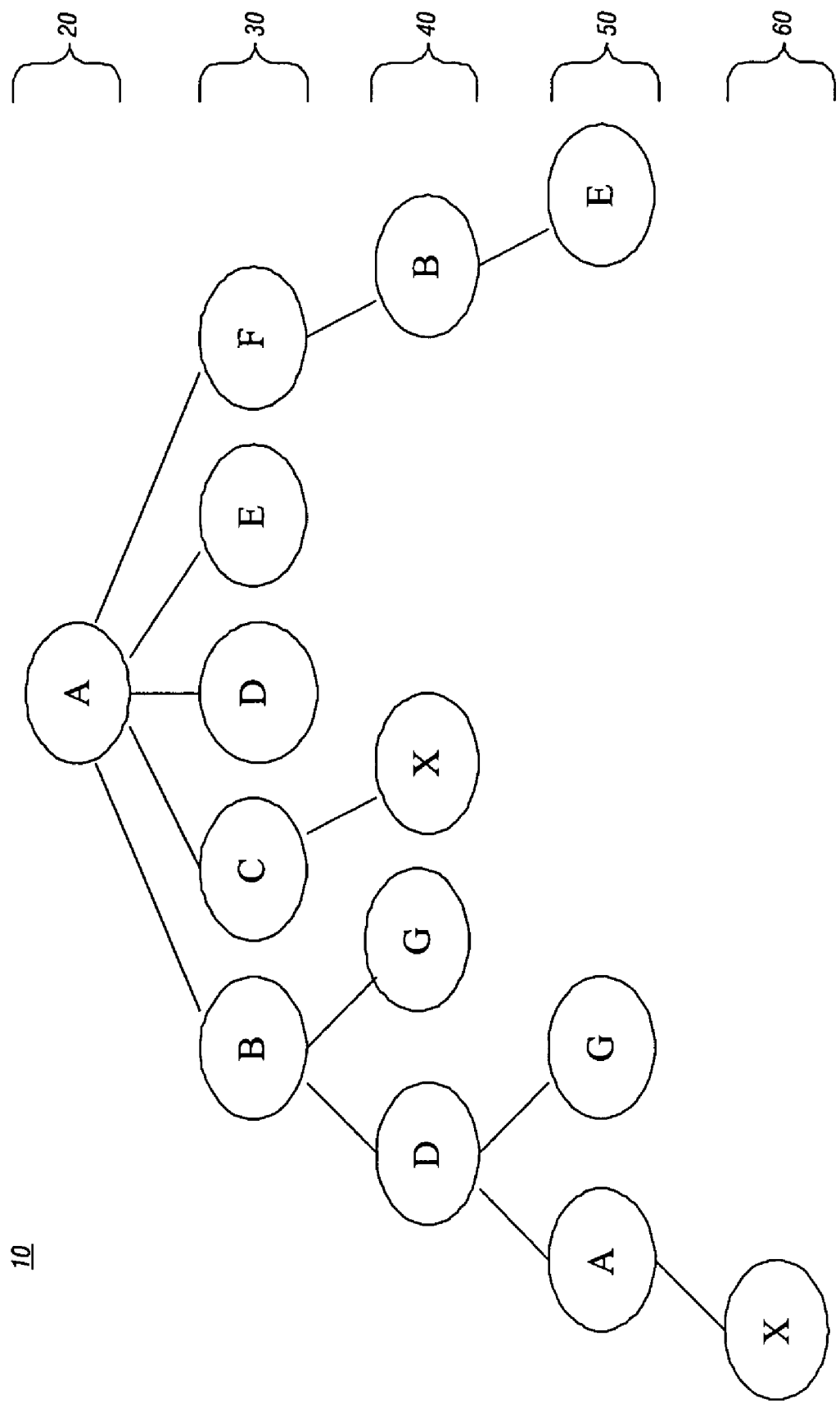
FIG. 1 is a document object model (DOM) tree structure that represents a hierarchy of an Extensible Markup Language (XML) document.

Referring now to FIG. 1, shown is a DOM tree structure that represents a hierarchy of an example XML document. The DOM tree nodes each contain a description of the node and have context information to represent the node's location within the tree. Each node may correspond to an element of the XML document. As shown in FIG. 1, tree structure 10 includes a plurality of levels, including a parent level 20 followed by a number of child levels 30, 40, 50 and 60. It is to be understood that the hierarchical structure shown in FIG. 1 is for purposes of illustration, and different hierarchies may be present in different embodiments.

As shown in FIG. 1, parent level 20 includes a single node A. In its immediate child level 30, there are five sibling nodes B, C, D, E and F. Continuing down the tree structure 10, the next lower level 40 includes branches descending from nodes B, C, and F. Specifically, nodes D and G branch from node B, while nodes X and B descend from nodes C and F, respectively.

In turn, nodes D and B of level 40 have branches extending therefrom. Specifically, node D has nodes A and G extending therefrom, while node B of level 40 has a child node E of level 50. In turn, a node X of level 60 is shown to descend from node A of level 50.

As discussed above, such a tree structure may be formed as an intermediate representation while processing an XML document. From this tree structure, data within each of the nodes may be manipulated and the tree may further be modified. Upon completion of such modifications, the tree structure may be converted back into an XML document and transmitted to another system as an XML document.

Figure 2:
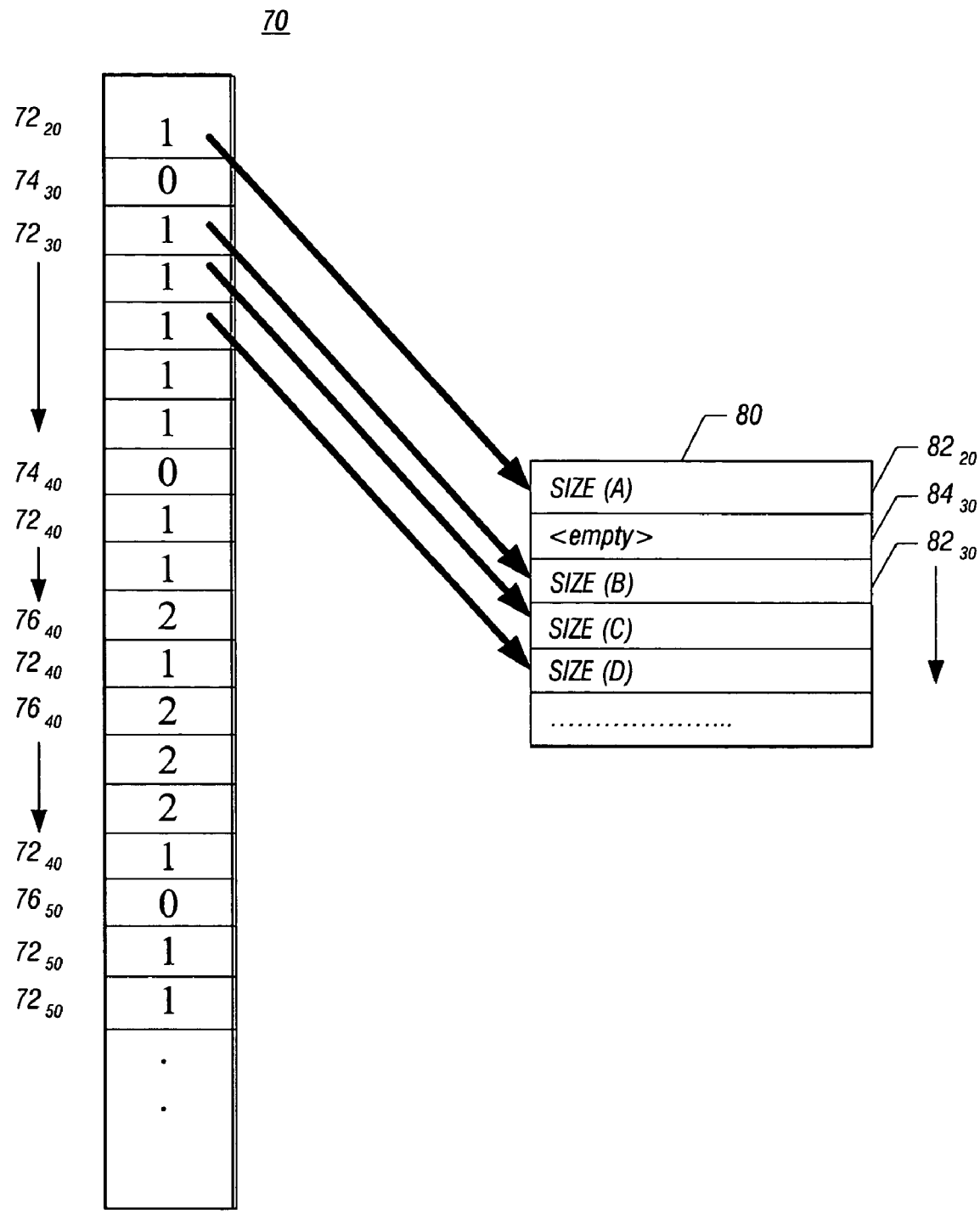
FIG. 2 is an example embodiment of structural information for the XML document of FIG. 1.

Referring now to FIG. 2, shown is a representation of structural information for tree structure 10 of FIG. 1. As shown in FIG. 2, the structural information may include a vector 70, which may be a bit vector having entries corresponding to the hierarchy of an XML document's tree structure. Further shown in FIG. 2 is an array 80, which may be used to store information regarding a size of each element of the XML document.

Specifically, vector 70 includes entries corresponding to the hierarchy of tree structure 10 of FIG. 1. In one embodiment, the following nomenclature may be used to define entries within a bit vector:

a "1" indicates the presence of a node;

a "0" indicates that tree traversal is going down to the next level; and a "2" indicates the skipping of a sibling of a parent level to the level currently being traversed (as it has no children).

Of course, in other embodiments a different nomenclature may be used. For example, a first value may be used to indicate node presence, while one or more different values may be used to provide structural information. While a breadth-first traversal of the tree may be performed in some embodiments, the same representation may be used to perform a depth-first tree traversal.

Thus as shown in FIG. 2, the first entry $72_{20}$ has a value of '1', indicating the presence of node A. The '0' value in the following entry $74_{30}$ indicates the traversal of the tree from first level 20 to second level 30. The next following five entries $72_{30}$ each have a value of '1', indicating the presence of nodes B-F of level 30.

Still referring to vector 70 of FIG. 2, the '0' of entry $74_{40}$ indicates traversal of tree 10 from second level 30 to third level 40. The corresponding '1' values of entries $72_{40}$ indicate the presence of nodes D and G of third level 40. The value of '2' in entry $76_{40}$ indicates the skipping from sibling B to sibling C of node 30, such that the following value of '1' for entry $72_{40}$ indicates the presence of node X in third level 40. In similar fashion, the three following entries $76_{40}$ each having a value of '2' indicate the skipping from sibling C to sibling F of second level 30 such that the following value of '1' for entry $72_{40}$ indicates the presence of child node B descending from node F of second level 30.

In similar fashion, the '0' value of entry $76_{50}$ indicates traversing of tree 10 from third level 40 to fourth level 50. The corresponding '1' values for entries $72_{50}$ indicate the presence of nodes A and G of fourth level 50. It is to be understood that vector 70 may continue in a similar fashion for all nodes and levels of tree 10.

To further illustrate the embodiment of vector 70 of FIG. 2 in a breadth-first traversal, refer to TABLE 1.

incorporated into the underlying XML document, or may be appended thereto, or may be maintained as a separate file associated with the underlying XML document.

Figure 3:
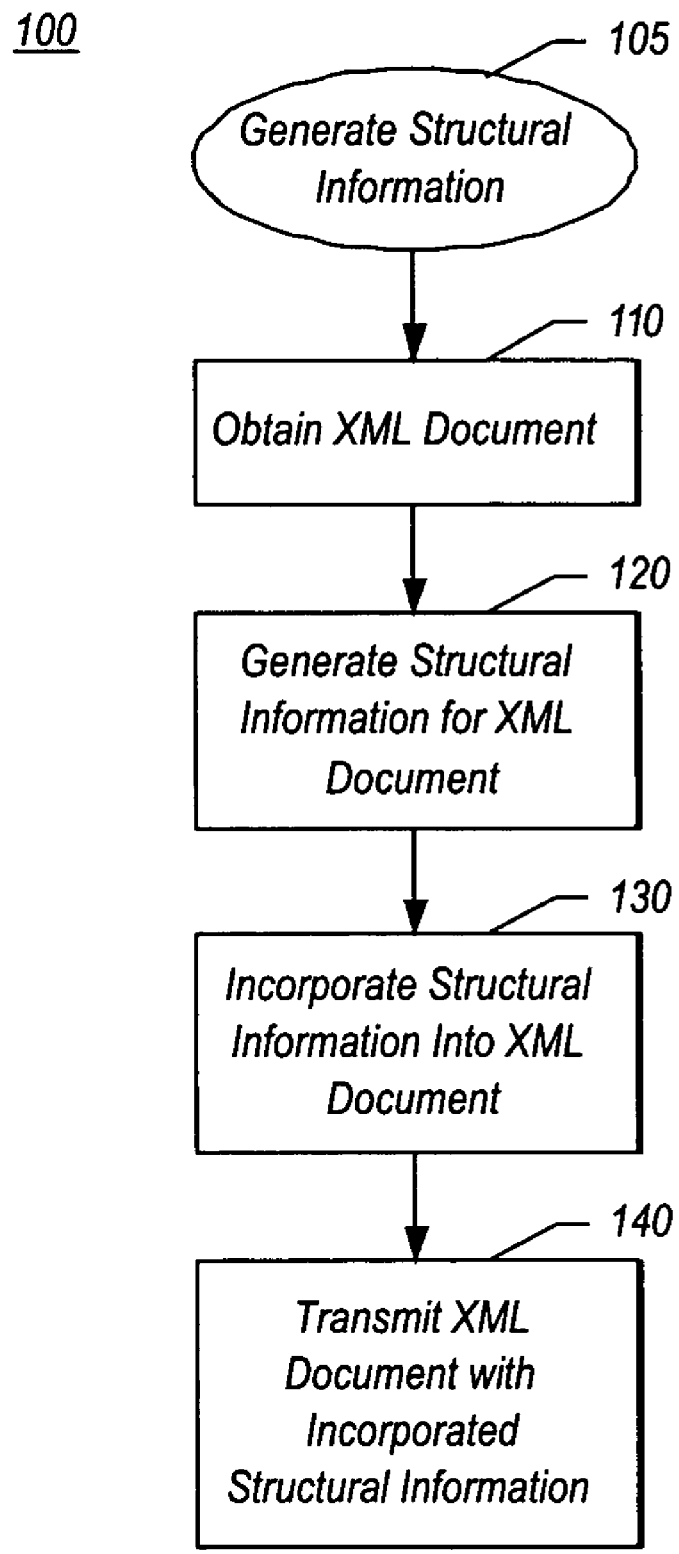
FIG. 3 is a flow diagram of a method of generating structural information in accordance with one embodiment of the present invention.

Referring now to FIG. 3, shown is a flow diagram of a method in accordance with one embodiment of the present invention. Specifically, as shown in FIG. 3, method 100 may be used to generate structural information for an XML document. Method 100 may be a software routine and may start at oval 105. First, an XML document may be obtained (block 110). For example, an online catalog that is in an XML format may be accessed via a browser. To be able to modify information in the document, such as various fillable entry items, the XML document is typically analyzed and converted into an intermediate representation, such as a DOM tree.

Based on such a hierarchical structure, structural information may be generated for the XML document (block 120). For example, in one embodiment the structural information may include a bit vector and a size array as discussed above. Next, the structural information may be incorporated into the XML document (block 130). While shown as being incorporated into the XML document, in other embodiments, the structural information may be maintained as a separate file associated with the underlying XML document, for example, via a tag. In one embodiment, the structural information may be incorporated in an appended fashion at the end of the underlying XML document.

The XML document with the incorporated structural information may then be transmitted (block 140). For example, a

TABLE 1

| Node "A" | Node "B" | Node "C" | Node "D" | Node "E" | Node "F" | Node "D" | Node "G" | Node "X" | Node "B" | Node "A" | Node "G" | Node "E" | Node "X" |
|---|---|---|---|---|---|---|---|---|---|---|---|---|---|
| 1 | 01 | 1 | 1 | 1 | 1 | 01 | 1 | 21 | 2221 | 01 | 1 | 2221 | 01 |

As shown in TABLE 1, the hierarchy of tree structure 10 is traversed beginning with first level 20 (i.e., node A), and continuing through fifth level 60 (i.e., node X). While shown in TABLE 1 with a single digit for each element, in some embodiments each element of the bit vector is a 2-bit quantity; for example a '0' is actually "00"; a '1' is "01"; and so forth.

In various embodiments, the bit vector is accompanied with a size indicator array that provides the size of each node of the tree. For each entry in the bit vector that represents the existence of a node (i.e., a value of '1'), a corresponding entry in the size indicator array may contain the node size. In such manner, a receiver may allocate the necessary memory space to store the element corresponding to the node. In various embodiments, for entries with values of '0' or '2' (indicating only structural information), the corresponding entry in the size indicator array may be left empty (or NULL).

Still referring to FIG. 2, a size array 80 may include a plurality of entries, each corresponding to a size of the element represented by a node of the tree structure. Specifically, as shown in FIG. 2, entry $82_{20}$ may store the size of node A, while entries $82_{30}$ include the respective sizes of nodes B, C and D. As further shown in array 80, an empty entry $84_{30}$ may be present for each entry of vector 70 corresponding to a '0' value or a '2' value (indicating only structural information).

Vector 70 may thus represent the DOM tree internally to conserve space. The textual node content may be segregated from the bit vector. That is, the nodes can themselves be placed in an entirely different data structure independent of the tree representation. The structural information may be modified XML document that includes various information written into fillable portions of the document may be sent back to its source with the incorporated structural information.

Figure 4:
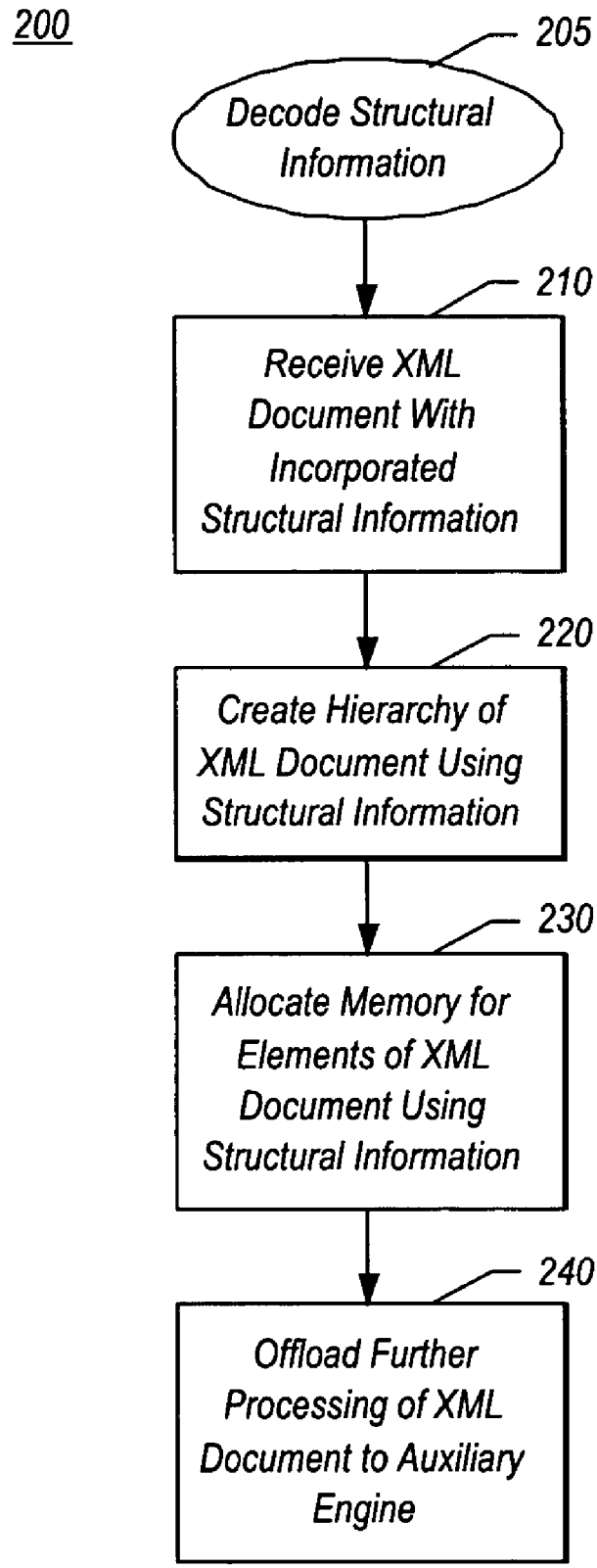
FIG. 4 is a flow diagram of a method of decoding structural information in accordance with an embodiment of the present invention.

Referring now to FIG. 4, shown is a flow diagram of another method in accordance with an embodiment of the present invention. Specifically method 200 may be a software routine used to decode structural information, and may begin at oval 205.

As shown in FIG. 4, an XML document with incorporated structural information may be received (block 210). For example, a back-end server associated with an e-tailer may receive an XML document that includes a customer's information, along with the structural information. Next, a hierarchy of the XML document may be created using the structural information (block 220). Specifically, a bit vector representation of the XML document may be used to create a tree structure for the document. As an example, such operation may occur within a central processing unit (CPU) of the back-end server.

Furthermore, memory may be allocated for the elements of the XML document using the structural information (block 230). For example, a size array may be accessed by the CPU in order to allocate appropriate amounts of memory to store the contents of each element of the XML document. In some embodiments, only desired information may be stored, such as elements corresponding to modified information, for example.

In such manner, a hierarchical structural outline of the XML document may be rapidly obtained. Then the CPU may offload further processing of the XML document to an auxiliary engine (block 240). For example, the tree structure and memory allocation information may be sent to a parsing engine. That is, the operation of parsing the document and filling in the tree can be posted to an auxiliary parsing engine. The XML parsing, as a result, can be done asynchronously and may free up processing cycles on the general-purpose CPU for useful application work.

Figure 5:
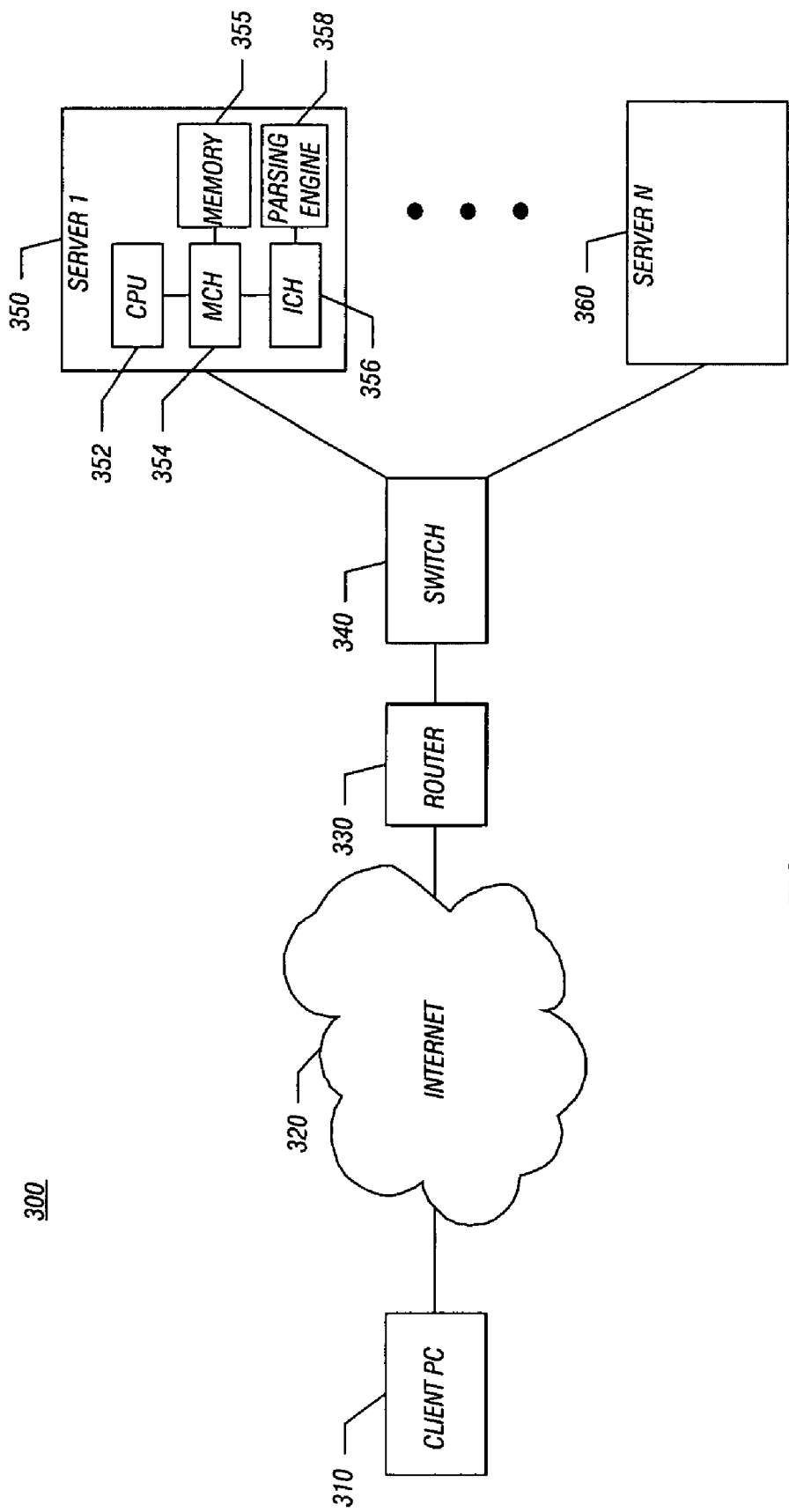
FIG. 5 is a block diagram of a system in accordance with one embodiment of the present invention.

Referring now to FIG. 5, shown is a block diagram of a system in accordance with one embodiment of the present invention. As shown in FIG. 5, system 300 may be a client/server architecture for communication between a client such as a consumer and a remote server such as an e-tailer. As shown in FIG. 5, a client personal computer (PC) 310 which may include a conventional PC architecture, is coupled to remote sites via a network, such as an Internet network 320. In turn, at a remote site Internet 320 may be connected through a router 330 and a switch 340 to a plurality of servers, including representative servers 350 and 360.

As described above, the servers may be associated with an e-tailer and may be back-end servers for handling various applications associated with an e-commerce website. Such functions may include maintenance of an online catalog, maintenance of inventory, and handling of communications with remote entities, such as client PC 310. As an example, each server may be dedicated to one or more specific applications, such as inventory, catalog, credit card processing, and the like.

As shown in FIG. 5, server 350 may include various components, including a CPU 352, which may be coupled to a memory controller hub (MCH) 354. In turn, MCH 354 may be coupled to a memory 355, which in one embodiment may be a dynamic random access memory (DRAM). During operation, memory 355 may include instructions for execution by CPU 352 or other processing devices to generate and/or decode structural information in accordance with an embodiment of the present invention. MCH 354 may also be coupled to an input/output controller hub (ICH) 356. As further shown in FIG. 5, an auxiliary parsing engine 358 may be coupled to ICH 356. Parsing engine 358 may be used to parse XML documents based on structural information contained in the documents.

For example, as described above CPU 352 may generate a tree structure and allocate memory based on structural information within an XML document and then offload further processing of the XML document to parsing engine 358. While not shown for ease of illustration in FIG. 5, it is to be understood that in various embodiments, a similar architecture to that shown in server 350 may be present in server 360 and client PC 310.

In various embodiments, the structural information incorporated into an XML message may have minimal overhead. Using the bit vector described above, the size of the bit vector is rather small, namely 2 bits per element in the document. The size of the size indicator array depends on the maximum size of the elements in the document (which in turn depends on the application domain). Consider an example. If a maximum size of elements in a document is 64 bytes, the corresponding size indicator entry will be 6 bits long. Thus, the overhead of the size indicator array in this example is only 1.2%; including the bit vector, the total overhead is still only 1.6%. Furthermore, the overhead decreases as the size of the elements in the document increases.

In various embodiments, this additional data can also be compressed using various compression schemes, such as a Lemple-Ziv (LZ) algorithm or other dictionary-based compression algorithm, for example. The bit vector and size array may also be encrypted to ensure secure transmission of the document. In some embodiments, the structural information may be encrypted independently of the rest of the XML message.

In embedded platforms, where cache size and memory bandwidth may be limited, this concise structural representation may be easily stored in the processor cache (thereby requiring no memory accesses) for better performance.

Embodiments may be implemented in a computer program that may be stored on a storage medium having instructions to program a system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    analyzing an extensible markup language (XML) file;
    generating structural information for the XML file corresponding to a hierarchical representation of the XML file, the structural information including a bit vector including entries corresponding to the hierarchical representation, wherein a first value in an entry indicates presence of a node of the hierarchical representation, a second value indicates a traversal to a next level of the hierarchical representation, and a third value indicates sibling skipping of a parent level to a current level of the hierarchical representation, the structural information further including an array including size entries each corresponding to a node of the hierarchical representation; and
    incorporating the structural information into the XML file.

2. The method of claim 1, further comprising encrypting the bit vector and the array.

3. The method of claim 1, further comprising transmitting the XML file with the incorporated structural information to a receiver.

4. The method of claim 1, further comprising traversing a tree structure of the XML file to generate the bit vector.

5. The method of claim 4, further comprising storing the first value in entries of the bit vector corresponding to presence of each node of the tree structure, and storing the second and third values in entries of the bit vector corresponding to a hierarchy of the tree structure.

6. The method of claim 1, wherein corresponding size entries of the array for the bit vector entries having the second value or the third value are empty.

7. An article comprising a machine-accessible storage medium containing instructions that if executed enable a system to:
    analyze an extensible markup language (XML) file;
    generate a vector including entries corresponding to a hierarchical representation of the XML file, wherein the entries include a first value to indicate presence of a node of the hierarchical representation, or a second or third value to indicate a hierarchy of the hierarchical representation; and incorporate the vector into the XML file.

8. The article of claim 7, further comprising instructions that if executed enable the system to generate an array including size entries each corresponding to an element of the XML file and incorporate the array into the XML file.

9. A system comprising:

a processor; and a dynamic random access memory coupled to the processor including instructions that if executed enable the system to receive an extensible markup language (XML) file including structural information, the structural information including a bit vector corresponding to a hierarchical representation of the XML file, wherein the bit vector includes a first value in entries of the bit vector corresponding to presence of each node of the hierarchical representation, and second and third values in entries of the bit vector corresponding to a hierarchy of the hierarchical representation, and decode the structural information to create a tree structure for the XML file and to allocate memory for storage of elements of the XML file.

10. The system of claim 9, further comprising an auxiliary parsing engine to parse the XML file based on the tree structure.

11. The system of claim 10, further comprising instructions that if executed enable the system to post a parsing operation for the XML file from the processor to the auxiliary parsing engine.

12. The system of claim 10, wherein the auxiliary parsing engine is to asynchronously parse the XML file.

13. A method comprising:

receiving an extensible markup language (XML) file including structural information, the structural information including a bit vector corresponding to a hierarchical representation of the XML file;

decoding the structural information to create a tree structure for the XML file and to allocate memory for storage of elements of the XML file; and wherein the bit vector includes a first value in entries of the bit vector corresponding to presence of each node of the hierarchical representation, and second and third values in entries of the bit vector corresponding to a hierarchy of the hierarchical representation.

14. The method of claim 13, wherein the second value indicates a traversal to a next level of the hierarchical representation, and the third value indicates sibling skipping of a parent level to a current level of the hierarchical representation.

15. The method of claim 13, further comprising decoding the bit vector of the structural information including entries corresponding to the tree structure to generate the free structure of the XML file.

16. The method of claim 11, further comprising decoding an array of the structural information including size entries each corresponding to one of the elements of the XML file.

17. The method of claim 16, further comprising allocating the memory based on the size entries of the array.

18. The method of claim 13, further comprising decoding the structural information in a processor of a system and posting a parsing operation for the XML file from the processor to an auxiliary parsing engine.

19. The method of claim 18, further comprising asynchronously parsing the XML file using the auxiliary parsing engine.

20. A method comprising:

generating a bit vector corresponding to a hierarchical representation of a document having a plurality of elements;

storing the bit vector in the document;

generating size entries each corresponding to one of the plurality of elements;

storing the size entries in the document; and wherein the bit vector includes a first value in entries of the bit vector corresponding to presence of each node of the hierarchical representation, and second and third values in entries of the bit vector corresponding to a hierarchy of the hierarchical representation.

21. The method of claim 20, wherein corresponding entries of an array for the bit vector entries having the second value or the third value are empty.

\* \* \* \* \*